United States Patent
Nesher et al.

(10) Patent No.: US 7,546,599 B2
(45) Date of Patent: Jun. 9, 2009

(54) METHOD, APPARATUS AND SYSTEM FOR INSTRUCTING A VIRTUAL DEVICE FROM A VIRTUAL MACHINE

(75) Inventors: Nadav Nesher, Nesher (IL); Ke Yu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 11/014,710

(22) Filed: Dec. 20, 2004

(65) Prior Publication Data

US 2006/0136934 A1    Jun. 22, 2006

(51) Int. Cl.
*G06F 9/455* (2006.01)
*G06F 9/46* (2006.01)
*G06F 9/44* (2006.01)

(52) U.S. Cl. .................. 718/1; 718/104; 719/313; 719/321; 719/322

(58) Field of Classification Search ........ 719/313, 719/321–327; 718/1, 104
See application file for complete search history.

(56) References Cited

U.S. PATENT DOCUMENTS

| | | | | |
|---|---|---|---|---|
| 5,257,386 A | * | 10/1993 | Saito | 712/225 |
| 5,337,412 A | * | 8/1994 | Baker et al. | 719/324 |
| 5,696,970 A | * | 12/1997 | Sandage et al. | 719/324 |
| 5,732,282 A | * | 3/1998 | Provino et al. | 719/324 |
| 5,784,615 A | * | 7/1998 | Lipe et al. | 719/324 |
| 6,247,067 B1 | * | 6/2001 | Berliner et al. | 719/321 |
| 6,353,857 B2 | * | 3/2002 | Bader et al. | 709/246 |
| 6,661,435 B2 | * | 12/2003 | Nason et al. | 715/778 |
| 6,766,470 B1 | * | 7/2004 | Shah | 714/9 |
| 6,799,225 B2 | * | 9/2004 | Sands et al. | 710/5 |
| 6,959,440 B1 | * | 10/2005 | Shah | 719/327 |
| 7,299,468 B2 | * | 11/2007 | Casey et al. | 718/104 |
| 2001/0037414 A1 | * | 11/2001 | Sands et al. | 709/324 |
| 2002/0143842 A1 | * | 10/2002 | Cota-Robles et al. | 709/1 |
| 2005/0039180 A1 | * | 2/2005 | Fultheim et al. | 718/1 |
| 2005/0120160 A1 | * | 6/2005 | Plouffe et al. | 711/1 |
| 2005/0204366 A1 | * | 9/2005 | Billau et al. | 719/324 |
| 2006/0005184 A1 | * | 1/2006 | Tewari et al. | 718/1 |
| 2006/0130074 A1 | * | 6/2006 | Kumar | 719/324 |

OTHER PUBLICATIONS

Jay Munro "Virtual Machines & VMware, Part I", extremetech.com dated Nov. 24, 2004.
Jeff Tyson and Ed Grabianowski "How PCI Works" computer. howstuffworks.com/pcl1.htm, dated Nov. 14, 2004.
"I/O Accelerates into the Express Lane" intel.com;/standards/case/case_pci.htm. dated Nov. 14, 2004.

* cited by examiner

*Primary Examiner*—Meng-Ai An
*Assistant Examiner*—Jennifer N To
(74) *Attorney, Agent, or Firm*—Pearl Cohen Zedek Latzer, LLP

(57) ABSTRACT

A method, apparatus and system for a virtual machine to issue an instruction to a virtual device, such virtual device being monitored by a management core of a virtual machine monitor. The virtual machine may instruct the virtual device to enter into for example a chat mode, a statistic mode, a file transfer mode or to execute or perform other functions. A management core of a virtual machine monitor may for example collect, channel, route or direct such instructions to a host, one or more other virtual machines or other components in a host network.

19 Claims, 2 Drawing Sheets

(12) United States Patent
US 7,546,599 B2

METHOD, APPARATUS AND SYSTEM FOR INSTRUCTING A VIRTUAL DEVICE FROM A VIRTUAL MACHINE

BACKGROUND OF THE INVENTION

A virtual machine (VM) may be or include a framework or environment created by for example a virtual machine monitor (VMM) on a host system. A VMM may provide facilities or resources on a host environment for an application, firmware or guest operating system (OS) that may run in the VM. Instructions may be conveyed from the VM to the VMM, and the VMM may execute such instructions for example on or through the host environment.

Multiple VMs may run on a host at particular time. While a VMM may allocate resources among the various VMs, a VMM may lack a way to efficiently transfer data, messages, statistics and other communication signals among the VMs that are running in a host environment

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention. The scope of the invention is not limited to the examples given.

Unless specifically stated otherwise, throughout the specification, discussions utilizing terms such as "processing," "computing," "calculating," "determining," or the like, refer to the action and/or processes of a processor, computer or computing system, or similar electronic or hardware computing device, that manipulates and/or transforms data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer, communication device or other apparatus. The desired structure for a variety of these systems will appear from the description below. In addition, embodiments of the present invention are not described with reference to any particular programming language, machine code, etc. It will be appreciated that a variety of programming languages, machine codes, etc. may be used to implement the teachings of the invention as described herein Embodiments of the invention may be included on a medium or article such as a mass storage memory, hard disc, "disc on key" or other memory unit having stored thereon machine-accessible instruction that when executed result in or implement an embodiment of the invention.

Figure 1:
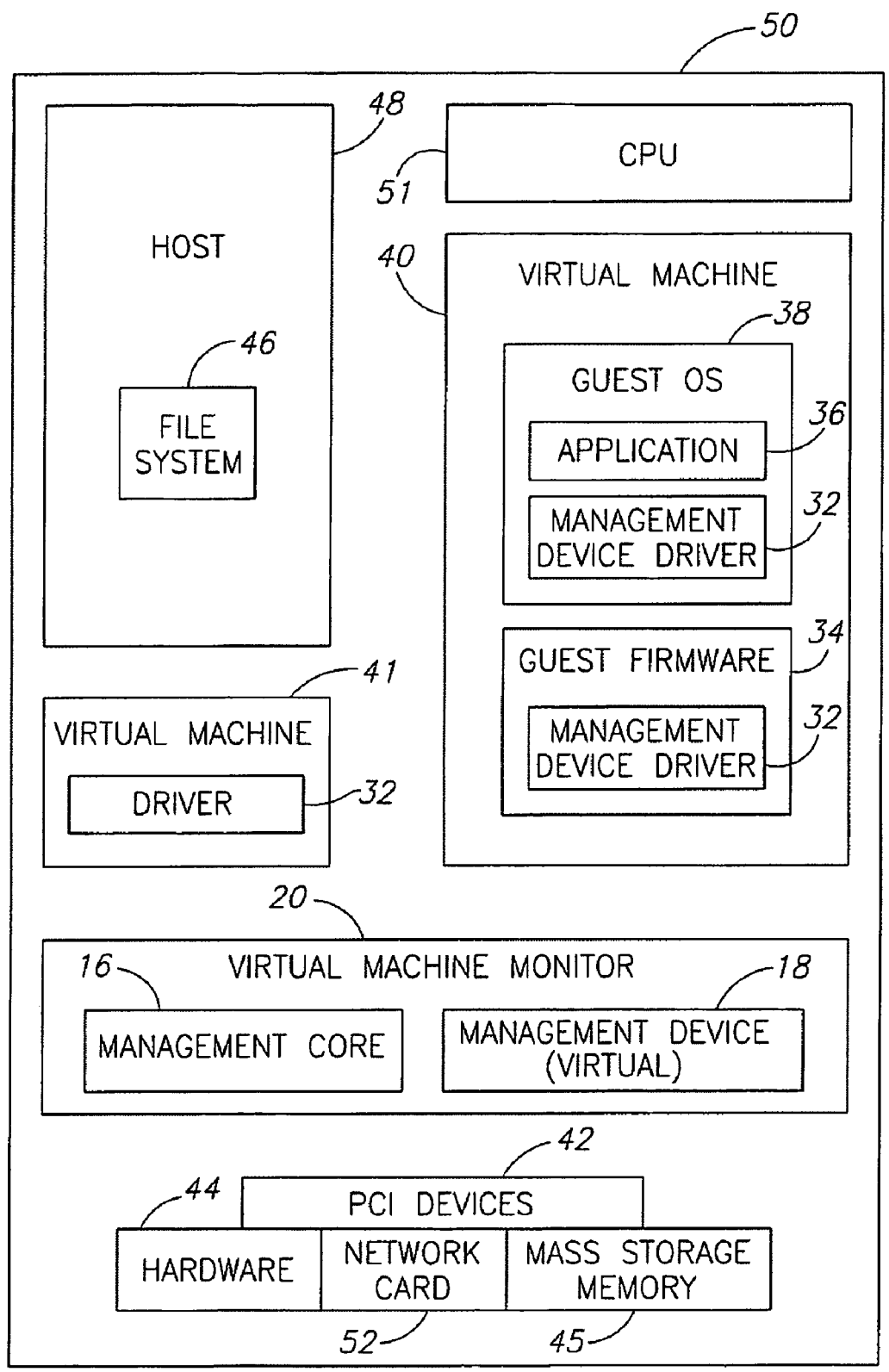
FIG. 1 is a schematic diagram of a host environment with a virtual machine, in accordance with an exemplary embodiment of the invention.

Reference is made to FIG. 1, a schematic diagram of a host environment with a virtual machine in accordance with an exemplary embodiment of the invention. Host environment 50 may be or include a computer platform such as for example a mainframe, workstation, personal computer or other computing devices, and may include some or all of the components, peripherals or other resources that may be available to or connected with such host environment 50. Host environment 50 may include for example a host OS 48 that may for example control some or all of the operations of a central processing unit (CPU) 51 or other processor. Host OS 48 may manage or coordinate resources of host environment 50 such as for example a file system 46 that may allocate and index files such as for example data files. Host environment 50 may also include hardware 44 resources such as for example one or more disc drives or other mass storage memory device 45, modems, sound card, peripheral devices, etc. Some of such hardware or devices may be for example devices that meet or operate using a peripheral component interconnect (PCI) specification such as the specification described in IEEE Standard Physical and Environmental Layers for PCI Mezzanine Cards, IEEE Standard 1386-2001 and 1386.1-2001. A PCI device 42 may include for example a printer, microphone, mouse, joystick, network card 52, disk adapter etc. Other devices and resources may be included or connected with a host environment 50, and a host may include other components. In some embodiments network card 52 may link different computers or components of computers that may communicate with a VM 40.

Host environment 50 may include a VM 40 that may include for example a guest OS 38 that may for example run an application 36. For example, in some embodiments a host 48 may run a Windows™ OS while VM 40 may run a UNIX™ OS. In some embodiments VM 40 may run for example a guest firmware 34 such as for example an extended firmware interface. In some embodiments more than one VM 40 such as VM 40 and VM 41 may run for example simultaneously in a host environment 50. Other operating systems, combinations of operating systems, firmware or applications may be run on a host environment in accordance with an embodiment of the invention.

Host Environment 50 may also include a VMM 20 that may create and manage a VM 40 and allocate resources within for example host environment 50 to support one or more VM 40. In some embodiments, a host environment 50 may include a host OS 48 and a VMM 20 or a VMM 20 without a host OS 48. In some embodiments VMM 20 may include a virtual management device 18 and a management core 16.

Virtual management device 18 may be a real or virtual device that may be created or defined for example by VMM 20 as a virtual device within host environment 50. In some embodiments, virtual management device 18 may not be connected to or represented by a real instance of a device, and may not be reflected in a real device that is connected to a hardware component. In some embodiments virtual management device 18 may be defined as a PCI device, though devices created in accordance with other types or definitions may be used. Such other types or definitions may include for example devices that comply with standards such as for example universal serial bus as is described in Universal Serial Bus Revision 2.0 Specification released on Apr. 27, 2000 USB. Other possible architectures and arrangements of components are possible. A host, VMM, and VM may include other components or arrangements of components.

In some embodiments, there may be created or defined in VMM 20 a management core 16 that may be or include one or more instructions, segments of code or software that may monitor, collect, direct or manage instructions sent by for example one or more VM 40 to or from one or more management devices 18 or other components of host network 50.

A VM 40 may include a management device driver 32 that may issue one or more instructions to management device 18. In some embodiments, module or driver 32 may be stored on for example a mass storage memory device 45, and may be or include one or more instructions, lines of code or collections of software that may interpret or translate instructions or commands from a VM 40 into a format or language that may be processed by virtual management device 18. In some embodiments driver 32 may comply with the standards used by PCI devices and a PCI bus. Other standards or formats for driver 32 may be used. In some embodiments a driver 32 may be updated, refreshed or reloaded by for example VMM 20 or by another component operably attached to host environment 50 without significant disruption to the operation of VM 40. Similarly, the software, code and the corresponding capabilities of device 18 and core 16 may be improved or updated without significantly disrupting VMM 40 or the VM 20 managed by VMM 40.

In operation, a function, process or application running for example on VM 40 may call for a transfer of data, a file or other information to for example host OS 48 or to for example another VM 41. An instruction may be passed from VM 40 by way of driver 32 directing virtual management device 18 to operate in for example a file transfer mode. Management core 16 may monitor instructions passed to virtual management device 18. When such an instruction arrives at device 18, core 16 may for example relay the instruction for processing or execution for example by host OS 48 or by or on another resource operably connected to host environment 50. For example, core 16 may receive or direct a file or data to or from for example file system 46. A file may be read for example in a memory device managed by a file system 46, and may for example be written back to device 18. Device 18 may then transfer a file to VM 40. In some embodiments an instruction from VM 40 to device 18 may require the performance of a calculation by for example host OS 48, and the return of a result from such calculation back to device 18 for further transfer of such result to VM 40.

In another example, VM 40 and VM 41 may be operating concurrently and may be managed by VMM 20. As part of for example a scheduling task, it may be beneficial for VMM 20 to assess the resources needed by VM 40 and VM 41 at a particular time. To pass statistics or other data to for example VMM 20, a VM 40 may program virtual management device 18 by way of driver 32 to enter for example a statistics mode. Other suitable modes may be used. VM 40 may deliver for example usage and processing needs statistics to virtual management device 18. The delivered statistics may be monitored, collected or otherwise processed by for example management core 16 within for example VMM 20 to collect such statistics from one or more VMs 40. In some embodiments, such statistics may be conveyed to a host OS 48 or to another component or resource outside of VM 40 which is operably connected to host OS 48, where such statistics may be used as part of for example a scheduling of a CPU 51 to accommodate the processing requirements of VM 40.

In still another example, to facilitate delivering a message from VM 40 to another VM 41 or to an OS running on host OS 48, VM 40 may program virtual management device 18 by way of drive 32 to enter for example a chat mode. Other modes may be used. VM 40 may then initiate a message with virtual management device 18 or publish its existence and wait for a call. Other message passing methods may be used. Management core 16 may monitor virtual management device 18, and when a message is delivered to device 18, core 16 may route or direct a message received by device 18, as a destination, from device 18, as a source, to for example one or more other VM 41, as a destination. The message may likewise be directed to a host OS 48 or to another component or resource operably connected to host environment 50. In some embodiments, VMM 20 may deliver and initiate messages to VM 40 by way of device 18 and core 16.

Other functions and actions as may be performed by for example a PCI device may be programmed into for example driver 32 and device 18. In some embodiments of the invention, a transfer of instructions or files between VM 40 and VMM 20 by way of device 18 may avoid exposing internal memory or files between or among the VMM 20 and VM 40, or another VM 41, or host OS 48.

In some embodiments, messages, files or other data may be transferred to or from a VM 40 using one or more of input/output ports or direct memory access resources that are available to PCI devices such as device 18 in host environment 50. The size, format and length of data files to be transferred, whether fixed or variable, may in some embodiments be unlimited other than by the capacity of the host environment 50.

Figure 2:
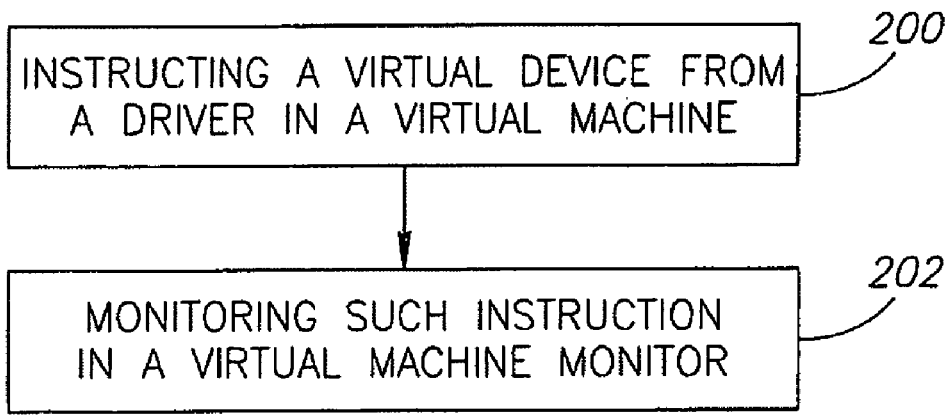
FIG. 2 is a flow diagram depicting a method of instructing a virtual device from a virtual machine in accordance with an embodiment of the invention.

Reference is made to FIG. 2, a flow diagram depicting a method of instructing a virtual device from a virtual machine in accordance with an embodiment of the invention. In block 200, a VM may issue an instruction, by way of for example a driver in such VM, to a virtual management device. In some embodiments the virtual management device may be defined and created by for example a VMM to comply with specifications of a PCI device; other devices may be specified. In some embodiments, the instruction may be for example a read or write instruction for the transfer of data between the VMM and the VM, or between the VM and for example a file system of a host OS. The instruction may be received in a virtual management device. In block 202 instructions reaching the virtual management device may be monitored by for example a management core that may be defined in the VMM. The management core may accept the instruction, and convey it to for example host OS or to a CPU where it may be executed.

In some embodiments the instruction may order the virtual management device to enter into for example a chat mode; other suitable modes may be used. The management core may collect messages received by virtual management device as a destination and may forward such messages to for example a host, to another VM or to another resource outside of the VM. Similarly, a VM may instruct virtual management device to enter a file transfer mode. VM may instruct virtual management device to retrieve or open a file. A management core may direct the instruction to for example a host OS or to a file system managed by host OS. The file may be transferred or otherwise made accessible to the management core which may transfer the file to virtual management device, and from there to the VM. Other operations or series of operations may be used.

Figure 3:
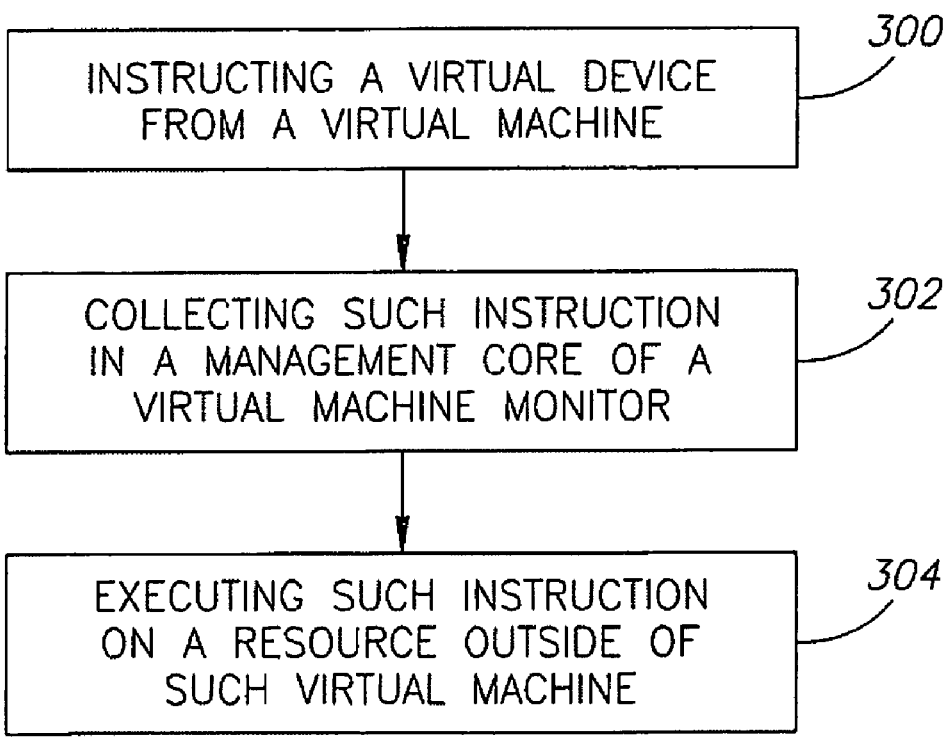
FIG. 3 is a flow chart of a method in accordance with an embodiment of the invention.

Reference is made to FIG. 3, a flow chart of a method in accordance with an embodiment of the invention. In block 300 an instruction may be issued from a VM to a virtual device. The instruction may be passed through a driver in the VM that is suitable for communicating with the virtual device.

In block 302, a component or segment of a VMM such as for example a management core may monitor and collect the instructions sent to the virtual device. In block 304, the VMM or the management core may direct the instruction or manage the execution of the instruction on a resource that is outside of the VM and the VMM such as for example hardware resources in a host environment. In some embodiments the instruction may include a message or data delivered to or from the VM. The VMM or the management core may collect data or files that are sent to or from a VM from for example a file system, from another VM or from another resource operably connected with a host environment, Other operations or series of operations, and other methods or parts of methods, are possible.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
   virtualizing a virtual machine monitor with a virtual management device, wherein the virtual management device is created by the virtual machine monitor as a virtual device with a host environment, wherein the virtual management device is created to be compliant with a device standard and wherein the virtual management device is not connected to a real instance of a device within the host environment;
   generating with the virtual machine monitor a virtual machine comprising a management device driver;
   transmitting from the virtual machine an instruction for a resource accessible by the virtual machine monitor, wherein the management device driver translates the instruction into an instruction that complies with the device standard and the management device driver directs the virtual management device to operate in one of a plurality of modes corresponding to a plurality of device functions by transmitting the instruction, wherein said plurality of modes comprises a chat mode, a file transfer mode, and a statistic mode;
   defining a management core of said virtual machine monitor, said management core suitable for monitoring said instruction;
   monitoring the instruction in the virtual machine monitor, on delivery to the virtual management device from the management device driver;
   accepting the instruction for processing by the virtual machine monitor through the virtual management device; and
   reloading the management device driver by the virtual machine monitor without disruption to the operation of the virtual machine.

2. The method as in claim 1, wherein said virtual management device complies with a peripheral component interconnect specification.

3. The method as in claim 1, wherein said management device driver directing the virtual management device to operate comprises instructing said virtual management device to operate in said chat mode; and comprising:
   accepting in said virtual management device a message from said virtual machine; and
   routing said message by said management core to another virtual machine.

4. The method as in claim 1, wherein said management device driver directing the virtual management device to operate comprises instructing said virtual management device to operate in said file transfer mode; and comprising executing said file transfer instruction in the host environment, wherein the host environment comprises an internal memory and a file system managed by a host operating system and said file transfer instruction is executed without exposing the internal memory.

5. The method as in claim 4, wherein said executing composes reading a file from said file system of said host.

6. The method as in claim 4, wherein said executing comprises writing a file to said file system of said host.

7. The method as in claim 1, wherein said management device driver directing the virtual management device to operate comprises instructing said virtual management device to operate in said statistics mode; and comprising collecting, at a management core, statistics from said virtual machine.

8. The method as in claim 7, comprising conveying said statistics to said host.

9. The method as in claim 8, comprising scheduling a processor of said host.

10. The method as in claim 1, comprising executing said instruction on a host of said virtual machine.

11. A method comprising:
   virtualizing a virtual machine monitor with a virtual management device, wherein the virtual management device is created by the virtual machine monitor as a virtual device within a host environment wherein the virtual management device is created to be compliant with a device standard and wherein the virtual management device is not connected to a real instance of a device within the host environment;
   generating with the virtual machine monitor a virtual machine comprising a management device driver;
   transmitting from the virtual machine a plurality of instructions for a plurality of resources accessible by the virtual machine monitor, wherein the management device driver translates each of the plurality of instructions into instructions that comply with the device standard and the management device driver directs the virtual management device to operate in at least one of a plurality of modes corresponding to a plurality of resources by transmitting the instructions, wherein said plurality of modes comprises a chat mode, a file transfer mode, and a statistics mode;
   collecting at least one of said plurality of instructions in a management core of the virtual machine monitor, where the management core monitors the at least one instruction on delivery to the virtual management device from the management device driver and where the management core accepts the at least one instruction for processing through the virtual management device;
   executing said instructions on a resource outside of said virtual machine; and
   reloading the management device driver by the virtual machine monitor without disruption to the operation of the virtual machine.

12. The method as in claim 11, wherein said management device driver directing the virtual management device to operate comprises transmitting at least one instruction instructing said virtual management device from said virtual device driver of said virtual machine.

13. The method as in claim 11, comprising returning a result of said at least one instruction from a resource outside of said virtual machine to said virtual machine.

14. An apparatus comprising:
a processor to:
   virtualize a virtual machine monitor operating within the processor with a virtual management device, wherein the virtual management device is created by the virtual machine monitor as a virtual device within a host environment, wherein the virtual management device is created to be compliant with a device standard and wherein the virtual management device is not connected to a real instance of a device within the host environment;
   generate with the virtual machine monitor a virtual machine comprising a management device driver;
   transmit from the virtual machine a plurality of instructions for a plurality of resources accessible by the virtual machine monitor, wherein the management device driver translates each of the plurality of instructions into instructions that comply with the device standard and the management device driver directs the virtual management device to operate in at least one of a plurality of modes corresponding to a plurality of resources by transmitting the instructions, wherein said plurality of modes comprises a chat mode, a file transfer mode, and a statistics mode;
   define a management core of said virtual machine monitor, said management core suitable to monitor at least one of said plurality of instructions;
   monitor said at least one of said plurality of instructions in the virtual machine monitor, on delivery to the virtual management device from the management device driver;
   accept the instruction for processing by the virtual machine monitor through the virtual management device; and
   reload the management device driver by the virtual machine monitor without disruption to the operation of the virtual machine.

15. The apparatus as in claim 14, wherein said processor is to:
   execute said at least one instruction; and
   deliver a result to said virtual management device.

16. A system comprising:
a processor;
a network card; and
a mass storage memory device;
   wherein said processor to:
      virtualize a virtual machine monitor with a virtual management device, wherein the virtual management device is created by the virtual machine monitor as a virtual device with a host environment, wherein the virtual management device is created to be compliant with a device standard and wherein the virtual management device is not connected to a real instance of a device within the host environment;
      generate with the virtual machine monitor a virtual machine comprising a management device driver;
      transmit from the virtual machine an instruction for a resource accessible by the virtual machine monitor, wherein the management device driver translates the instruction into an instruction that complies with the device standard and the management device driver directs the virtual management device to operate in one of a plurality of modes corresponding to a plurality of device functions by transmitting the instruction, wherein said plurality of modes comprises a chat mode, a file transfer mode, and a statistic mode;
      define a management core of said virtual machine monitor, said management core suitable for monitoring said instruction;
      monitor the instruction in the virtual machine monitor, on delivery to the virtual management device from the management device driver;
      accept the instruction for processing by the virtual machine monitor through the virtual management device;
      reload the management device driver by the virtual machine monitor without disruption to the operation of the virtual machine; and
      said mass storage memory device is to store said management device driver.

17. The system as in claim 16, wherein said processor is to:
   execute said instruction to said virtual management device to operate in said chat mode; and
   accept a message from said virtual machine; and
   route said message from said management core to another virtual machine.

18. An article comprising a machine accessible medium having stored thereon instructions that when executed result in:
   virtualizing a virtual machine monitor operating within the processor with a virtual management device, wherein the virtual management device is created by the virtual machine monitor as a virtual device within a host environment, wherein the virtual management device is created to be compliant with a device standard and wherein the virtual management device is not connected to a real instance of a device within the host environment;
   generating with the virtual machine monitor a virtual machine comprising a management device driver;
   transmitting from the virtual machine a plurality of instructions for a plurality of resources accessible by the virtual machine monitor, wherein the management device driver translates each of the plurality of instructions into instructions that comply with the device standard and the management device driver directs the virtual management device to operate in at least one of a plurality of modes corresponding to a plurality of resources by transmitting the instructions, wherein said plurality of modes comprises a chat mode, a file transfer mode, and a statistics mode;
   defining a management core of said virtual machine monitor, said management core suitable to monitor at least one of said plurality of instructions;
   monitoring said at least one of said plurality of instructions in the virtual machine monitor, on delivery to the virtual management device from the management device driver;
   accepting the instruction for processing by the virtual machine monitor through the virtual management device; and
   reloading the management device driver by the virtual machine monitor without disruption to the operation of the virtual machine.

19. The article as in claim 18, wherein said execution of said instructions further results in:

transmitting from the management device driver at least one instruction of said plurality of instructions instructing said virtual device to operate in said file transfer mode; and executing said file transfer instruction in the host environment, wherein the host environment comprises an internal memory and a file system managed by a host operating system and said file transfer instruction is executed without exposing the internal memory.

* * * * *